United States Patent [19]

Marutake et al.

[11] 4,361,733
[45] Nov. 30, 1982

[54] HARD-OF-HEARING AID APPLIANCE

[75] Inventors: Yozo Marutake, Hino; Tatsuro Fukutome, Inagi; Yasuo Inaba, Kodaira; Kunihiko Fukuyama, Hino, all of Japan

[73] Assignee: Rion Kabushiki Kaisha, Japan

[21] Appl. No.: 172,739

[22] Filed: Jul. 28, 1980

[30] Foreign Application Priority Data

May 21, 1979 [JP] Japan .................. 54-62399

[51] Int. Cl.³ ............................. H04B 5/00
[52] U.S. Cl. .................................... 179/82
[58] Field of Search ............. 179/82, 107 R; 455/41

[56] References Cited

U.S. PATENT DOCUMENTS 3,601,550 8/1971 Spracklen ................. 179/82
3,711,651 1/1973 Connell .................... 179/82 X Primary Examiner—Joseph A. Popek
Attorney, Agent, or Firm—Beveridge, DeGrandi & Kline

[57] ABSTRACT

A hearing aid appliance has induction loops which are magnetically coupled to hearing aids held individually by hard-of-hearing persons. The number of induction loops is an integral multiple of two, and each induction loop is in the form of a rectangle having at least two parallel sides. The parallel sides of the induction loops are arranged in parallel with one another and equally spaced from one another so that signal currents flowing in adjacent parallel sides are shifted by 90° in phase.

4 Claims, 5 Drawing Figures

4 PARALLEL SIDES, PHASE DIFFERENCE 90°, (r = 1m)

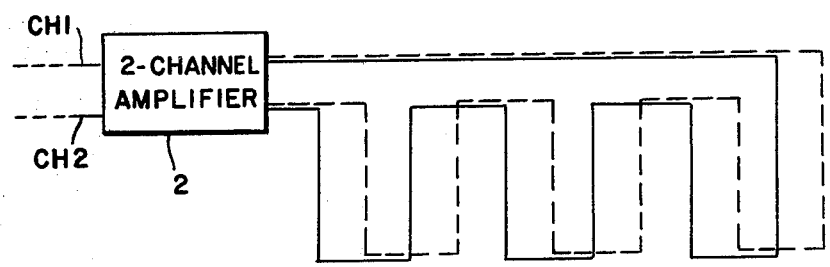
F I G. 4
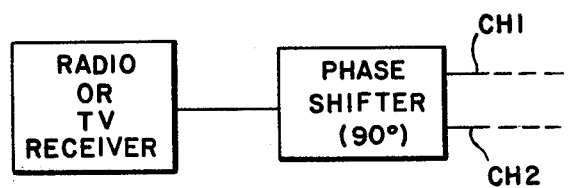
F I G. 5

HARD-OF-HEARING AID APPLIANCE

BACKGROUND OF THE INVENTION

This invention relates to hard-of-hearing aid appliances, and more particularly to an improvement of a hearing aid appliance in which an induction loop, in which signal currents corresponding to voices flow, is magnetically coupled to the sensitive reception coils of hearing aids.

The hearing aid appliance according to the invention is intended to be used for teaching or training a number of hard-of-hearing children by suitable placement of induction loops in the classroom, for instance.

It is well known in the art that the employment of a hearing aid appliance with an induction loop is superior to the employment of individual hearing aids the microphones of which are used to receive voice signals, in that the S/N ratio is excellent and difficulties or troubles in hearing are reduced which otherwise may be caused when hard-of-hearing children are far away from the instructor or by ambient noises. Nowadays, the use of a hearing aid appliance is essential in teaching or training hard-of-hearing children. However, hearing aid appliances of this type should satisfy at least the following conditions, because a plurality of hearing aid appliances are often used simultaneously in a plurality of classrooms adjacent to one another (including classrooms built one on another, such as classrooms on the first and second floors), and a number of hard-of-hearing children will move in the classroom.

(1) In the case where a plurality of hearing aid appliances are used in a plurality of classrooms adjacent to one another, the difference in level between the magnetic field strengths in adjacent classrooms should be of a value such that no signal interference occurs.

(2) The magnetic field strength in a classroom should not be greatly varied in the hearing area and in a plane at a height from the floor which corresponds to the height of the sensitive reception coils of the hearing aids held by the hard-of-hearing children.

A variety of hard-of-hearing aid appliances have been proposed in the art; however, none of them satisfy the above-described conditions. The basic arrangement of the induction loop of a conventional appliance is such that only one induction loop is laid so as to surround the ceiling or the floor of the classroom. The distribution of magnetic field strength in a central sectional area of the classroom with the induction loop thus laid is as shown in FIG. 1. The difference between the magnetic field strength at a height of 0.5 m above the floor and that at a height of 2.5 m above the floor is about 6 dB at the center. It can be readily understood from this that signals in adjacent classrooms (especially in the classrooms which are laid one on another) interfere with one another.

In order to minimize the signal interference, a method has been proposed in which a plurality of induction loops having shorter sides are laid. However, this method is not practical in use because the magnetic field is greatly varied (or dips) in the vicinity of the induction loops.

SUMMARY OF THE INVENTION

Accordingly, an object of this invention is to eliminate all of the above-described difficulties accompanying a conventional hearing aid appliance.

The foregoing object and other objects of the invention have been achieved by the provision of a hearing aid appliance in which the magnetic fields of induction loops in which signal currents corresponding to voices flow, are magnetically coupled to the sensitive coils of hearing aids, which, according to the invention, comprises: a 90° phase shifter for subjecting an input signal to 90° phase shift to provide a first channel signal and a second channel signal; a 2-channel amplifier for amplifying the first and second channel signals; and two induction loops connected to said amplifier for receiving the first and second channel signals thus amplified, each of the induction loops being arranged in the form of a rectangle having at least two parallel sides, the two parallel sides of one of the induction loops and the two parallel sides of the other induction loop being arranged in parallel with one another and equally spaced from one another so that the signals flowing in adjacent parallel sides are shifted by 90° in phase from each other.

The nature, principle and utility of the invention will become more apparent from the following detailed description when read in conjunction with the accompanying drawings.

BRIEF DESCRIPTION OF THE DRAWINGS

In the accompanying drawings

FIG. 4 is a partial block diagram depicting an alternative arrangement of the invention; and FIG. 5 is a partial block diagram of another alternative arrangement of the invention.

DETAILED DESCRIPTION OF THE INVENTION

Figure 1:
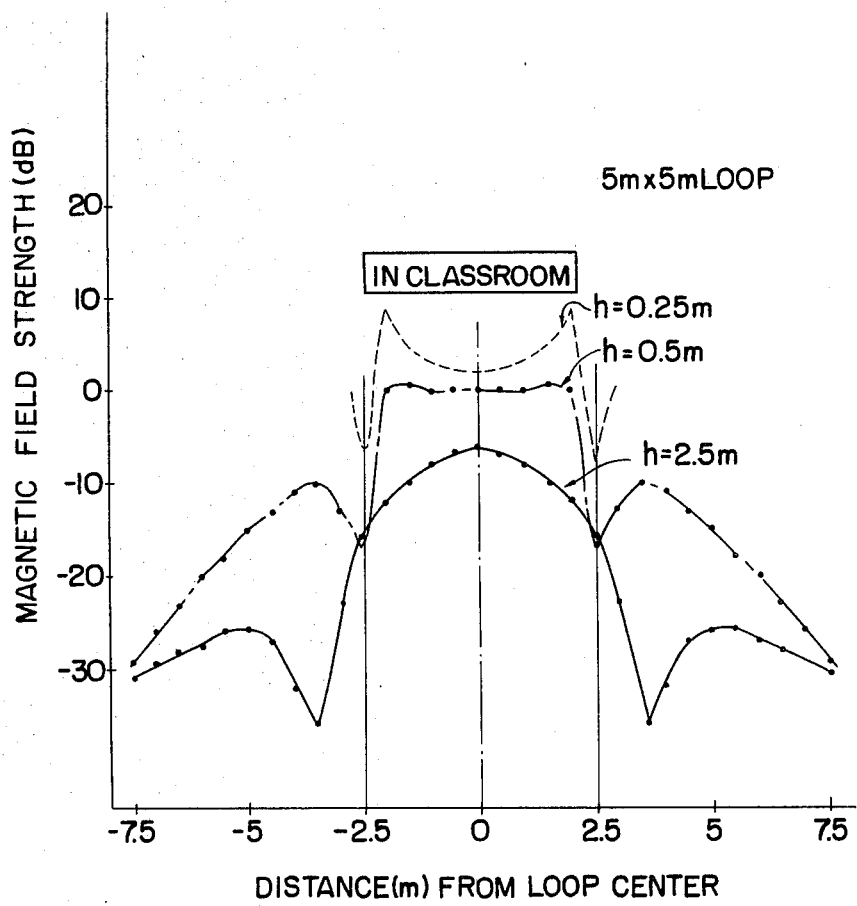
FIG. 1 is a graphical representation indicating one example of the distribution of magnetic field strength in a conventional hearing aid appliance.
Figure 2:
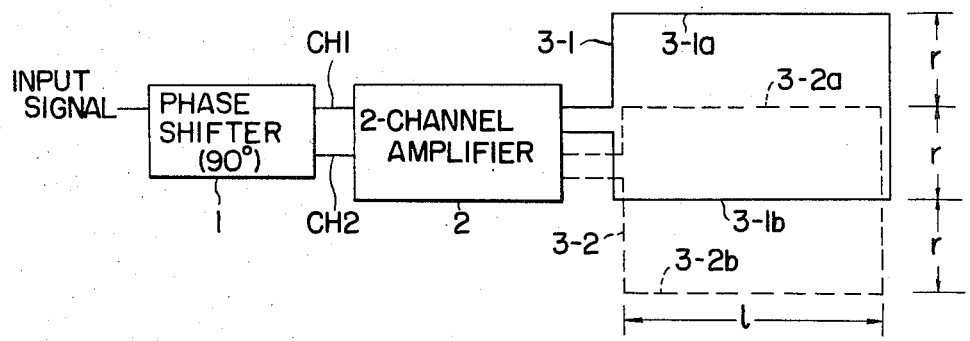
FIG. 2 is a block diagram showing one example of a hearing aid appliance according to this invention.

A hearing aid appliance according to this invention, as shown in FIG. 2, comprises: a 90° phase shifter 1; a 2-channel amplifier 2; and two induction loops 3-1 and 3-2.

An input signal to the appliance is subjected to 90° phase shift by the 90° phase shifter 1 to obtain two channel signals CH1 and CH2, shifted 90° in phase from one another. The channel signals CH1 and CH2 thus obtained, after being amplified by the 2-channel amplifier 2, are applied to the induction loops 3-1 and 3-2, respectively.

Figure 3:
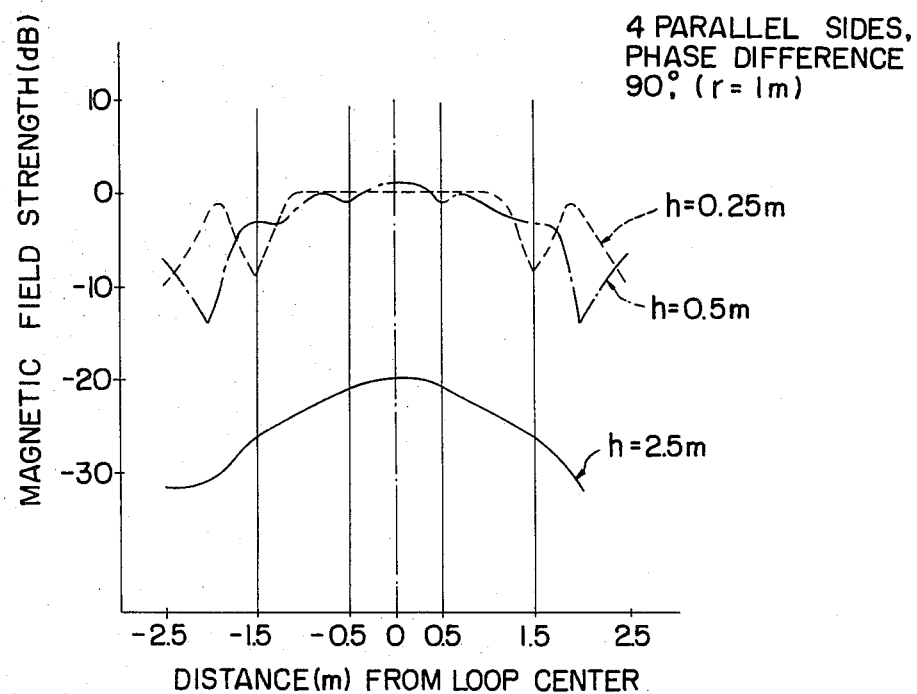
FIG. 3 is a graphical representation indicating one example of the distribution of magnetic field strength in the hard-of-hearing aid appliance in FIG. 2.

The induction loops 3-1 and 3-2 are rectangular, similar in size or dimension to each other, and arranged in such a manner that the sides of the induction loop 3-1 are in parallel with those of the induction loop 3-2, respectively, and more specifically the particular sides 3-1a, 3-2a, 3-1b and 3-2b of the induction loops 3-1 and 3-2, which have a length l, are in parallel with one another and are equally spaced by a width of about r from one another. By way of example, l is approximately 3 m, and r is approximately 1 m. The phases of the currents flowing in these particular sides are shifted by 90° degrees from one another so that the same phase relation is established between the particular sides of the induction loops. As a result, the distribution of magnetic field strength is considerably enhanced, as shown in FIG. 3. More specifically, in this case, the difference between the magnetic field strength at the central position of an area at a level of 0.5 m above the floor and the magnetic field strength at the central position of an area at a level of 2.5 m above the floor is about 20 dB. Therefore, the signal interference which otherwise may be caused between the lower and upper class-rooms adjacent to each other can be sufficiently eliminated.

The arrangement of the hearing aid appliance described above can be modified into a simpler one. However, it should be noted that, in practice, it is essential that the height and the area of the hearing position be determined from the area of a classroom and the positional relationships of the classroom to adjacent classrooms, and that the distance between the particular parallel sides of the induction loops and the number of particular parallel sides be determined from the height and area thus determined, so that the induction loops are laid so as to satisfy the above-described various conditions.

In this invention, the hearing area can be increased as desired by increasing the number of particular parallel sides of the induction to an integral multiple of four, as depicted in FIG. 4. Therefore, the induction loops can be laid with relatively flat magnetic field strength characteristics, in large lecture halls, gymnasiums, outdoor playgrounds or baseball fields where the conventional hearing aid appliance cannot be installed.

The hearing aid appliance according to the invention is applicable to hearing sounds from radio sets or television sets. In this case, the electronic circuit components, namely, the phase shifter and the 2-channel amplifier may be provided in the radio set or television set to receive signals therefrom, as depicted in FIG. 5.

As is apparent from the above description, the hearing aid appliance according to the invention is simple in construction and yet can considerably improve hearing.

What is claimed is:
1. A hearing aid appliance for creating magnetic fields corresponding to sounds for magnetic coupling to the reception coils of hearing aids, comprising:
   input means adapted to receive an input signal corresponding to sounds to be heard;
   a 90° phase shifter coupled to said input means for subjecting the input signal to a 90° phase shift, to provide a first channel signal substantially in phase with the input signal and a second channel signal shifted by 90° in phase with respect to the input signal;
   a 2-channel amplifier for amplifying the first and second channel signals; and
   two induction loops connected to said amplifier to receive the first and second amplified channel signals respectively, each of said induction loops being arranged in the form of a rectangle having at least two parallel sides, said parallel sides of one of said induction loops and said parallel sides of the other induction loop being arranged in parallel with one another, alternating with one another, and equally spaced from one another so that signals flowing in adjacent parallel sides are shifted by 90° in phase from each other.

2. An appliance as claimed in claim 1 further comprising means for coupling said input means to a radio set or a television set to receive input signals therefrom.

3. An appliance as claimed in claim 1, in which each of said parallel sides is about three meters in length, and said parallel sides are spaced about one meter from one another.

4. An appliance as claimed in claim 1 in which each induction loop has a plurality of parallel sides equal in number to an integral multiple of two.

* * * * *